US012561834B2

(12) United States Patent
Zhong

(10) Patent No.: US 12,561,834 B2
(45) Date of Patent: Feb. 24, 2026

(54) METHOD, APPARATUS, AND STORAGE MEDIUM FOR VEHICLE POSITIONING

(71) Applicant: Volvo Car Corporation, Gothenburg (SE)

(72) Inventor: Weiyu Zhong, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 304 days.

(21) Appl. No.: 18/385,471

(22) Filed: Oct. 31, 2023

(65) Prior Publication Data

US 2024/0144522 A1    May 2, 2024

(30) Foreign Application Priority Data

Oct. 31, 2022    (CN) .......................... 202211348137.7

(51) Int. Cl.
| | |
|---|---|
| *G06T 7/73* | (2017.01) |
| *G01C 21/36* | (2006.01) |
| *G06V 10/40* | (2022.01) |
| *G06V 20/58* | (2022.01) |
| *G08G 1/0969* | (2006.01) |

(52) U.S. Cl.
CPC ............ *G06T 7/73* (2017.01); *G01C 21/3667* (2013.01); *G06V 10/40* (2022.01); *G06V 20/58* (2022.01); *G08G 1/0969* (2013.01)

(58) Field of Classification Search
CPC . G06T 7/73; G06T 7/579; G06T 2207/30264; G01C 21/3667; G01C 21/3602; G06V 10/40; G06V 10/751; G06V 10/80; G06V 20/58; G06V 20/56; G08G 1/0969
See application file for complete search history.

(56) References Cited

U.S. PATENT DOCUMENTS

| | | | |
|---|---|---|---|
| 10,977,810 B2 * | 4/2021 | Murphy-Chutorian ...................... | |
| | | | G06T 7/246 |
| 2017/0176998 A1 | 6/2017 | Fechner et al. | |
| 2020/0184656 A1 * | 6/2020 | Murphy-Chutorian ...................... | |
| | | | G06T 7/246 |
| 2020/0193643 A1 * | 6/2020 | Hess ...................... | G06V 10/44 |
| 2022/0188578 A1 * | 6/2022 | Hu .................... | G06F 18/24323 |
| 2022/0324437 A1 * | 10/2022 | Blau ...................... | G01S 7/4817 |
| 2022/0333950 A1 * | 10/2022 | Akbarzadeh ....... | G01C 21/3804 |
| 2023/0097592 A1 * | 3/2023 | Feng .................... | G06V 10/751 |
| | | | 382/100 |

(Continued)

OTHER PUBLICATIONS

Zhao et al, Automatic Vector-Based Road Structure Mapping using Multibeam LiDAR, 2019, Remote Sensing 11, 1726; 1-19. (Year: 2019).*

(Continued)

*Primary Examiner* — Kathleen M Broughton
(74) *Attorney, Agent, or Firm* — Clements Bernard Walker; Christopher L. Bernard

(57) ABSTRACT

A method and apparatus for vehicle positioning, including: obtaining multiple channels of image data of surrounding environment of a vehicle, where the multiple channels of image data are taken by multiple cameras at different angles concurrently; processing the multiple channels of image data to extract feature points in an image frame of each channel of image data; transmitting the feature points to a cloud, and receiving from the cloud a coordinate of current position of the vehicle in a vector map obtained by feature point matching.

16 Claims, 7 Drawing Sheets

(56)         References Cited

U.S. PATENT DOCUMENTS

2024/0119701 A1*    4/2024   Nikolic ................. G06V 20/56

OTHER PUBLICATIONS

Liu et al, Neural RGBD Sensing: Depth and Uncertainty from a Video Camera, 2019, arXiv:1901.02571v1, pp. 1-13. (Year: 2019).*

Weon et al, Object Recognition Based Interpolation with 3D Lidar and Vision for Autonomous Driving of an Intelligent Vehicle, 2020, IEEE Digital Object Identifier, 8(2020); pp. 1-10. (Year: 2020).*

Apr. 4, 2024 European Search Report issued in corresponding EP Application No. 23206886.6.

* cited by examiner

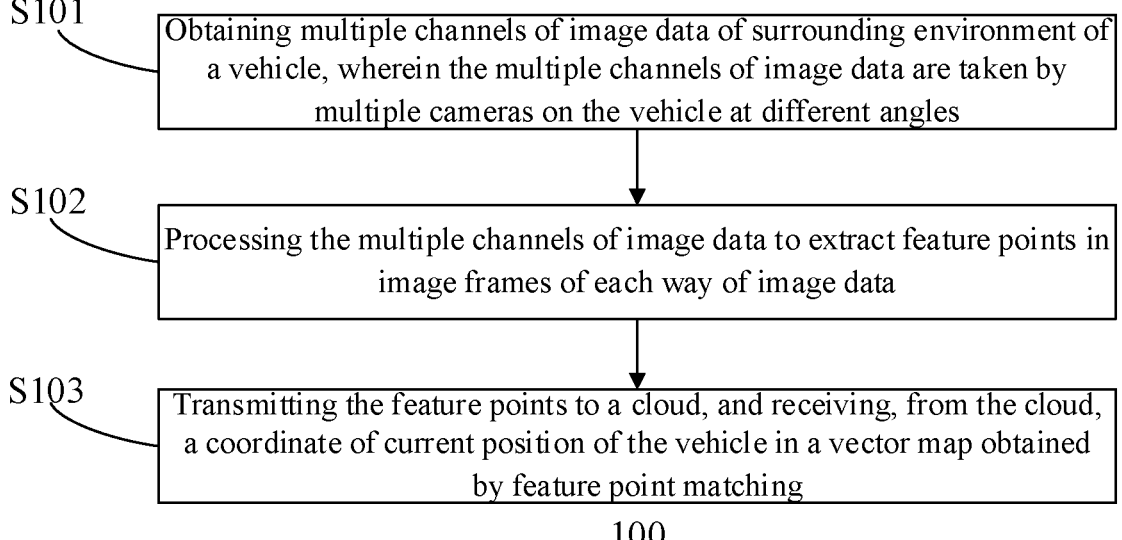

S101

Obtaining multiple channels of image data of surrounding environment of a vehicle, wherein the multiple channels of image data are taken by multiple cameras on the vehicle at different angles

S102

Processing the multiple channels of image data to extract feature points in image frames of each way of image data

S103

Transmitting the feature points to a cloud, and receiving, from the cloud, a coordinate of current position of the vehicle in a vector map obtained by feature point matching <u>100</u>

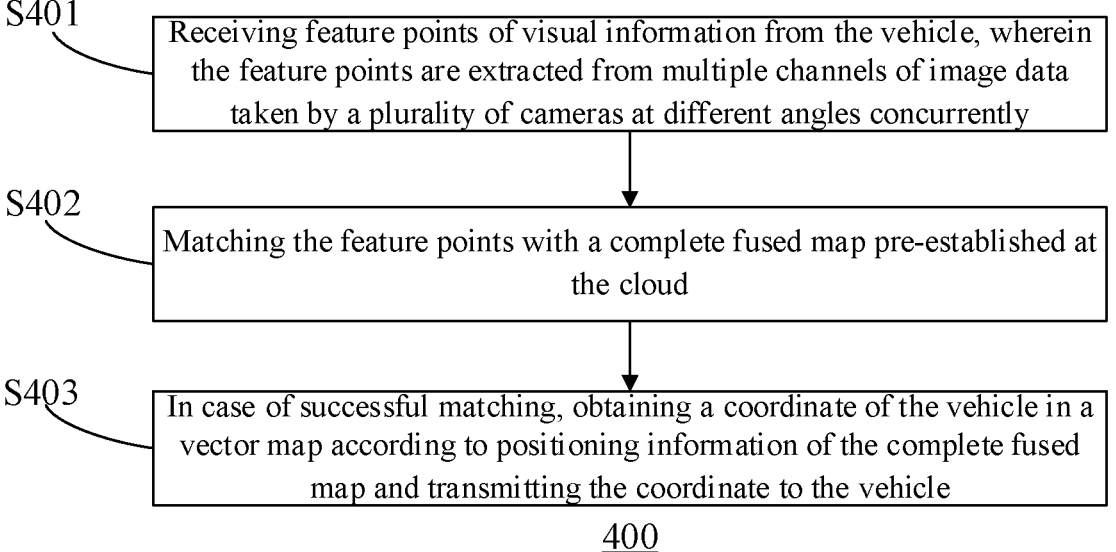

S401

Receiving feature points of visual information from the vehicle, wherein the feature points are extracted from multiple channels of image data taken by a plurality of cameras at different angles concurrently

S402

Matching the feature points with a complete fused map pre-established at the cloud

S403

In case of successful matching, obtaining a coordinate of the vehicle in a vector map according to positioning information of the complete fused map and transmitting the coordinate to the vehicle

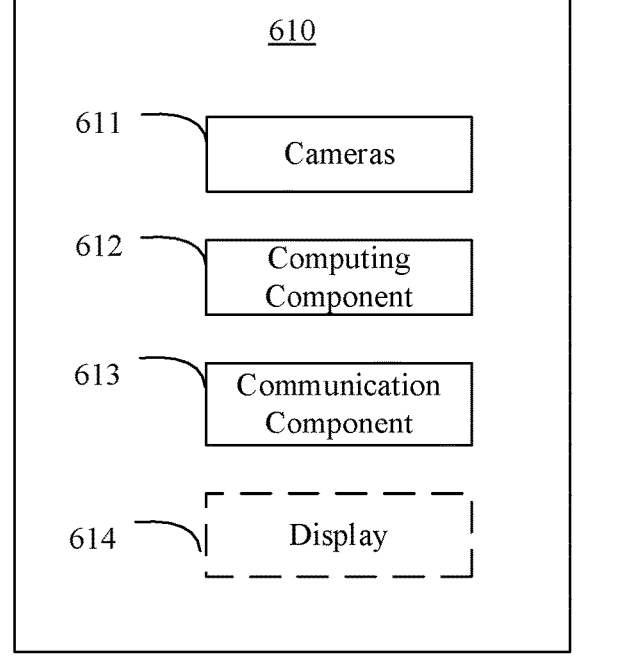
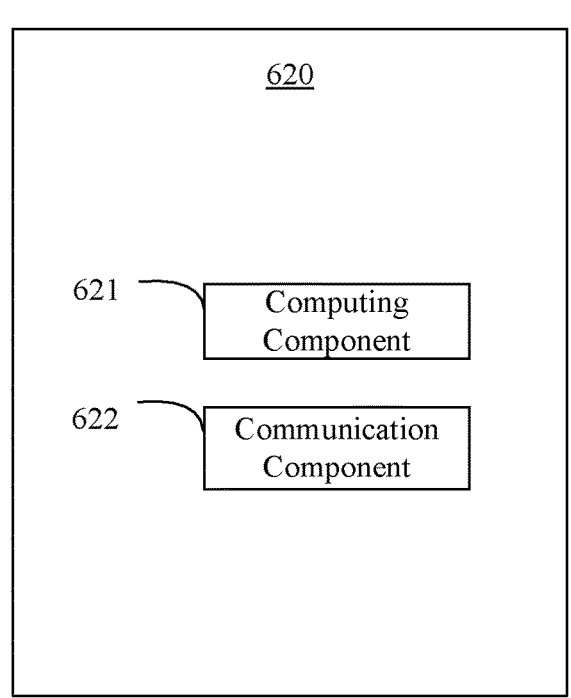
600
FIG. 6

METHOD, APPARATUS, AND STORAGE MEDIUM FOR VEHICLE POSITIONING

CROSS-REFERENCE TO RELATED APPLICATION

The present disclosure claims the benefit of priority of co-pending Chinese Patent Application No. 202211348137.7, filed on Oct. 31, 2022, and entitled "METHOD, APPARATUS, AND STORAGE MEDIUM FOR VEHICLE POSITIONING," the contents of which are incorporated in full by reference herein.

TECHNICAL FIELD

The present disclosure relates to the field of vehicles, and more particularly, to a method and apparatus for vehicle positioning.

BACKGROUND

As one of the key technologies to improve the experience in driving and riding, vehicle positioning technology can achieve precise positioning of vehicles through various positioning means and many types of sensors, thereby providing important position information to the driver of the vehicle or the driving assistance system or automatic driving system in the vehicle in order to make appropriate driving decisions. At present, the most common vehicle positioning technology is Global Positioning System (GPS) technology, which can achieve high-precision positioning in outdoor environments, but in indoor environments, it is often faced with problems such as signals being inclined to be attenuated or occluded, positioning precision being decreased and even failed, and so on.

The main application of vehicle positioning technology in indoor environments is vehicle positioning in indoor parking lots. However, large-scale indoor parking lots provided by shopping malls, residential quarters, and office buildings often have problems such as complex terrains and routes, unclear paths, etc. If a vehicle cannot be positioned accurately in the parking lot, the driver may be unable to determine his/her position where he/she is located in the indoor parking lot, which in turn affects making accurate driving decisions.

Therefore, there is a need for a technology that can quickly and accurately position a vehicle, especially a technology that can accurately position a vehicle in indoor scenarios such as parking lots.

SUMMARY

According to a first aspect of the present disclosure, there is provided a method for vehicle positioning, comprising: obtaining multiple channels of image data of surrounding environment of a vehicle, wherein the multiple channels of image data are taken by multiple cameras at different angles concurrently; processing the multiple channels of image data to extract feature points in image frames of each channel of image data; transmitting the feature points are to a cloud, and receiving from the cloud a coordinate of current position of the vehicle in a vector map obtained by feature point matching.

According to a second aspect of the present disclosure, there is provided a method for vehicle positioning, being performed at a cloud and comprising: receiving feature points of visual information from a vehicle, wherein the feature points are extracted from multiple channels of image data taken by multiple cameras at different angles concurrently; matching the feature points with a complete fused map pre-established at the cloud; in case of successful matching, obtaining a coordinate of the vehicle in a vector map according to positioning information of the complete fused map and transmitting the coordinate to the vehicle.

According to a third aspect of the present disclosure, there is provided an apparatus for vehicle positioning, comprising: multiple cameras, configured to take multiple channels of image data of surrounding environment of a vehicle at different angles concurrently; a computing component, configured to process the multiple channels of image data to extract feature points in image frames of each channel of image data; and a communication component, configured to transmit the feature points to a cloud, and receive from the cloud a coordinate of current position of the vehicle in a vector map obtained by feature point matching.

According to a fourth aspect of the present disclosure, there is provided a device for vehicle positioning, comprising: a memory, having stored computer instructions thereon; and a processor, wherein the instructions, when executed by the processor, cause the processor to perform the method according to the first aspect or second aspect of the present disclosure.

According to a fifth aspect of the present disclosure, there is provided a non-transitory computer-readable storage medium storing instructions that cause a processor to perform the method according to the first aspect or second aspect of the present disclosure.

By utilizing the method and apparatus provided by the present disclosure, vehicle positioning can be quickly and reliably realized through the cooperation between the cloud and the vehicle side, meanwhile, the visual input information can be favorably increased and the consumption of computing power at the vehicle side can be avoided.

BRIEF DESCRIPTION OF THE DRAWINGS

These and/or other aspects and advantages of the present disclosure will become clearer and easier to be understood from the following detailed description of embodiments of the present disclosure, taken in conjunction with the accompanying drawings, in which:

FIG. 1 illustrates a flowchart of a method for vehicle positioning performed at a vehicle side according to embodiments of the present disclosure;

FIG. 4 illustrates a flowchart of a method for vehicle positioning performed at a cloud according to embodiments of the present disclosure;

FIG. 6 illustrates a schematic diagram of a system for vehicle positioning according to embodiments of the present disclosure.

Figure 2:
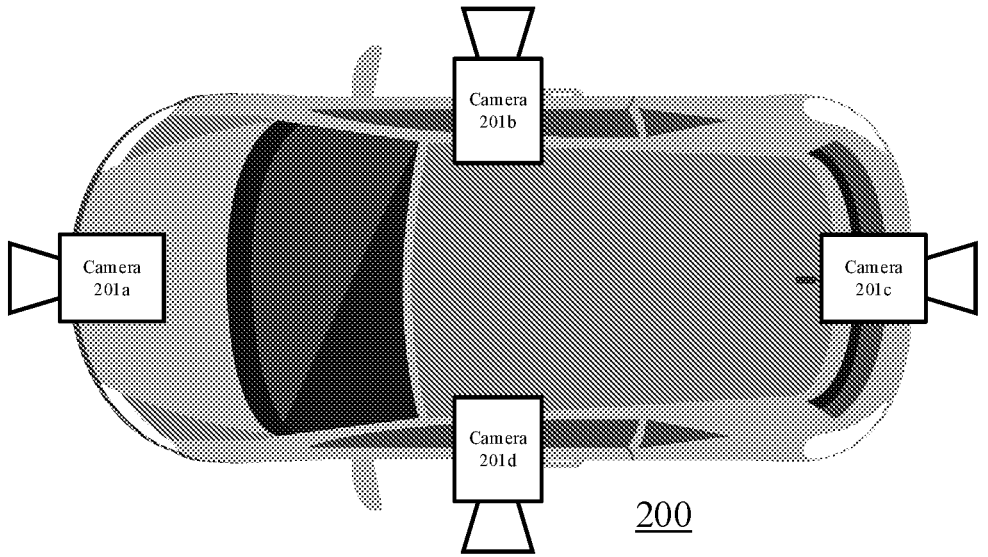
FIG. 2 illustrates a schematic diagram of a vehicle, mounted with multiple cameras, employed in a method for vehicle positioning according to embodiments of the present disclosure.

It should be understood that these accompanying drawings are used to provide a further understanding of the embodiments of the present invention and constitute a part of the specification, and together with the embodiments of the present invention, serve to explain the present invention, and do not constitute a limitation to the present invention. Furthermore, in the accompanying drawings, like reference numerals generally represent like parts or steps.

DETAILED DESCRIPTION

In order to better set forth the technical solution of the present disclosure, the present disclosure will be further detailedly illustrated in conjunction with the accompanying drawings and the detailed description. It should be understood that based on the embodiments described in the present invention, all other embodiments obtained by those skilled in the art without creative labor should fall within the protection scope of the present invention, and the embodiments described herein are only part of the embodiments of the present invention, not all the embodiments of the present invention. These embodiments are only illustrative and exemplary, and thus should not be interpreted as limiting the scope of the present invention.

Some current solutions for vehicle positioning include local processing of images of the surrounding environment obtained at a vehicle to obtain a processed image, and matching, locally or at the cloud, the processed image with a map to determine the current position of the vehicle. Specifically, the technology of Simultaneous Localization and Mapping (SLAM) is often adopted in vehicle positioning.

However, there may be some problems in the existing for example SLAM-based visual positioning technical solution. Firstly, the images of the surrounding environment obtained at the vehicle or the features in the images may have a relatively large amount of data, and the amount of data to be transmitted from the vehicle side to the cloud is relatively large in case it is required for the vehicle side to cooperate with the cloud to make full use of the sufficient computing power of the cloud. For example, the point cloud data generated by a 30 fps camera is on the order of 200 MB/km, and the current communication quality of the vehicle (especially in case the vehicle is indoors) may be difficult to meet the requirements of such data transmission. Secondly, in case the vehicle is located indoors, the lighting conditions may be nonuniform, resulting in the instability of the degree of brightness of the images taken at the vehicle. If no filtering is performed on the images, the positioning based on the images with insufficient brightness may be inaccurate. Thirdly, compared with the outdoor environment of traditional vehicle positioning, the indoor environment may be more complicated. The traditional monocular SLAM positioning technology or the like only has a single perspective and cannot cover the features of the indoor environment at different angles, which has great limitations.

Aiming at the above problems in the prior art, the present disclosure provides a method and apparatus for vehicle positioning.

FIG. 1 illustrates a flowchart of a method 100 for vehicle positioning according to embodiments of the present disclosure, which may be performed at a vehicle side. It should be understood that the method 100 shown in FIG. 1 is applicable not only for vehicle positioning, but also for indoor or outdoor positioning of mobile devices.

As shown in FIG. 1, at step S101, multiple channels of image data of surrounding environment of a vehicle may be obtained, where the multiple channels of image data are taken by multiple cameras on the vehicle at different angles concurrently. Here, the image data of the surrounding environment of the vehicle may refer to the image of the environmental currently located around the vehicle, which is obtained by taking the vehicle as the shooting point. As a non-limiting example, in case the vehicle is currently located in an indoor parking lot, the image data of the surrounding environment of the vehicle may be an image of the indoor parking lot including roads, intersections, columns, signboards, and the like. In the embodiment according to the present disclosure, multiple cameras on the vehicle may take corresponding individual channels of image data at a plurality of aligned moments.

FIG. 2 illustrates a schematic diagram of a vehicle 200, mounted with multiple cameras 201, employed in a method for vehicle positioning according to embodiments of the present disclosure. In the example shown in FIG. 2, a camera 201a as a front view camera, a camera 201b as a right camera, a camera 201c as a rear view camera, and a camera 201d as a left camera are respectively mounted on the front part, right part, rear part and left part of the vehicle 200, and these cameras 201a-201d may be configured to shoot parts of the surrounding environment located in the front, right, rear and left of the vehicle respectively. Preferably, the cameras 201a, 201b, 201c, and 201d can form a round view camera system together, thereby providing an environmental image with a 360-degree full field of view perspective around the vehicle.

It should be understood that the cameras 201a to 201d shown in FIG. 2 are on-board cameras of the vehicle 200, but the present disclosure is not limited thereto. Additionally or alternatively, the camera used for vehicle positioning may also be other apparatus capable of taking images and transmitting the taken images to the vehicle. As a non-limiting example, such an apparatus may be a mobile device (such as mobile phone, etc.) carried by an occupant (such as driver, etc.) of the vehicle 200, which can shoot the surrounding environment of the vehicle 200 and transmit the shot images of the surrounding environment to the vehicle 200.

Referring back to FIG. 1, at step S102, the multiple channels of image data may be processed to extract feature points in image frames of each channel of image data. Here, feature points may refer to points that can characterize the visual information of objects in the surrounding environment, so that vehicle positioning can be realized by feature point matching.

Figure 3:
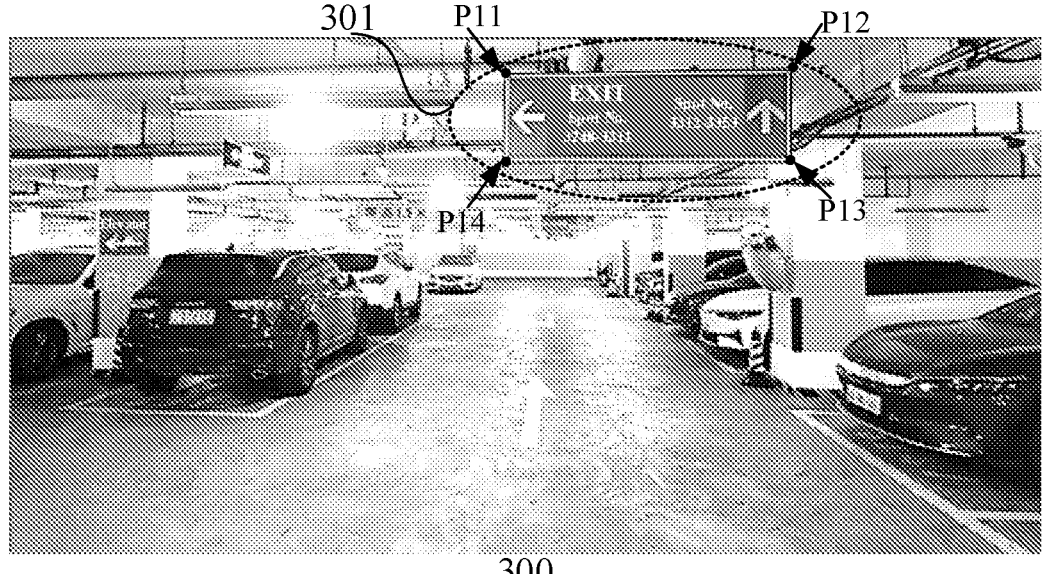
FIG. 3 illustrates a non-limiting example of image data of surrounding environment of a vehicle.

FIG. 3 is a schematic diagram of an image frame 300 in a certain channel of image of surrounding environment of a vehicle taken in a method for vehicle positioning according to embodiments of the present disclosure. The image frame 300 includes columns (e.g., structural columns or load-bearing columns) and signboards (e.g., direction signboards) in an indoor parking lot, and such objects are representative objects that are helpful for visual feature point matching. In this step S102, feature points may be extracted from the image frames by various image processing algorithms. As illustrative examples, algorithms such as Scale Invariant Feature Transform (SIFT), Speeded Up Robust Features (SURF), Gradient Location and Orientation Histogram (GLOH), and the like may be used to extract features such as angular points, edges, and the like of the above representative objects. As a non-limiting example, when the image frame 300 is being processed, one or more of angular points P11, P12, P13, and P14 of signboard 301, which is a representative object, may be extracted as feature point, so that the vehicle can be positioned based on feature point matching of signboard 301.

In the embodiment of the present disclosure, the processing of the multiple channels of image data may include SLAM modeling of the multiple channels of image data to extract feature points of visual information from image frames of each channel of image data in the multiple channels of image data. It should be understood that the processing in the present disclosure is not limited to SLAM modeling, but may include any image processing method capable of extracting feature points for feature point matching.

Referring back to FIG. 1, at step S103, the feature points may be transmitted to the cloud and the coordinate of the current position of the vehicle in the vector map obtained by feature point matching may be received from the cloud. It can be understood that the cloud may employ various appropriate feature point matching to obtain the coordinate of the current position of the vehicle, which is not limited by this embodiment, and an exemplary feature point matching method according to embodiments of the present disclosure will be described below with reference to FIG. 4. Optionally, in one embodiment, in this step 103, the feature points of image frames of each channel of image data may not be transmitted to the cloud, but only the feature points of the preferred image frame may be transmitted to the cloud. Specifically, in step 102, the method may further comprise determining confidences of image frames of each channel of image data and selecting a preferred frame from the image frames of multiple channels of image data based on the confidences of the image frames. For example, the first frame with a confidence higher than a threshold (as a non-limiting example, the threshold is 70%) in an order may be selected, as the preferred frame, from the image frames of the multiple channels of image data, or a frame with the highest confidence may be selected as the preferred frame. As a non-limiting example, for N image frames of N channels of image data at a certain moment, the confidences of the N image frames may be calculated, and an image frame with the highest confidence may be selected therefrom, as the preferred frame of the N channels of image data at this moment, or the first frame with a confidence higher than the threshold may be selected as the preferred frame of the N channels of image data at this moment according to a certain predetermined order (e.g., an order of numbering from 1 to N). In the present disclosure, the confidence may be a value characterizing the quality of the image frame. Various appropriate methods can be adopted to determine the confidences of calculating image frames. For example, the more feature points are extracted from an image frame, the higher the confidence of the image frame is. In this way, the feature points of image frames with relatively high quality can be transmitted to the cloud for feature point matching, thereby improving the accuracy of feature point matching; also, for N channels of image data, only data equivalent to the amount of one channel of image data may be transmitted to the cloud, thereby greatly reducing the amount of data transmitted between the vehicle side and the cloud.

The method for vehicle positioning according to the embodiment of the present disclosure has been described above with reference to FIG. 1. As a non-limiting example, optionally, after the vehicle obtains its own coordinate in the vector map, the map to be displayed on a display of the vehicle may further be rendered based on the coordinate in the method for vehicle positioning, so that the result of vehicle positioning can be presented to the driver for human-computer interaction.

FIG. 4 illustrates a flowchart of a method 400 for vehicle positioning performed at a cloud according to embodiments of the present disclosure.

As shown in FIG. 4, at step S401, feature points of visual information may be received from a vehicle, where the feature points are extracted from multiple channels of image data taken by multiple cameras at different angles concurrently.

Next, at step S402, the feature points may be matched with a complete fused map pre-established at a cloud. Here, the complete fused map may encompass detailed information of the scenario where the vehicle is located. In the embodiment of the present disclosure, the fused map may include a point cloud basemap and a vector map. Taking a case in which the vehicle is located in a parking lot as an example, the point cloud basemap may include point cloud data measured at roads and intersections in the parking lot for various objects existing in the parking lot (such as columns, signboards, etc.), which is suitable for matching with the images actually taken by the vehicle for visual repositioning; and the vector map may include vector graphic elements (e.g., points, lines, rectangles, polygons, circles, arcs, etc.) describing geometric characteristics of the roads and intersections in the parking lot, which are suitable to be presented on the on-board display for the driver to observe and know the position thereof in real-time. It should be noted that the point cloud basemap and the vector map contained in the fused map are associated with each other, that is, every position (e.g., road or intersection) in the parking lot may be represented by a specific vector graphic element, and a point cloud pattern that can be observed or measured from a position is also unique to this position, where the mapping therebetween is exclusive. Since the point cloud basemap in the fused map includes point cloud data of an entire scenario measured in advance for various objects in the scenario, by matching feature points extracted from the actually taken image frames with the point cloud data, the specific position of the shooting site in the scenario may be determined according to the similarity between the extracted feature points and the point cloud data.

At step S403, in case the matching is successful, the coordinate of the vehicle in the vector map may be obtained according to positioning information of the complete fused map and transmitted to the vehicle. Specifically, according to the degree of matching between the extracted feature points and the point cloud data and the mapping relationship between the point cloud basemap and the vector map, the specific position coordinate of the vehicle in the vector map may be determined according to the visual positioning algorithm, and the position coordinate may be transmitted to the vehicle.

Figure 5:
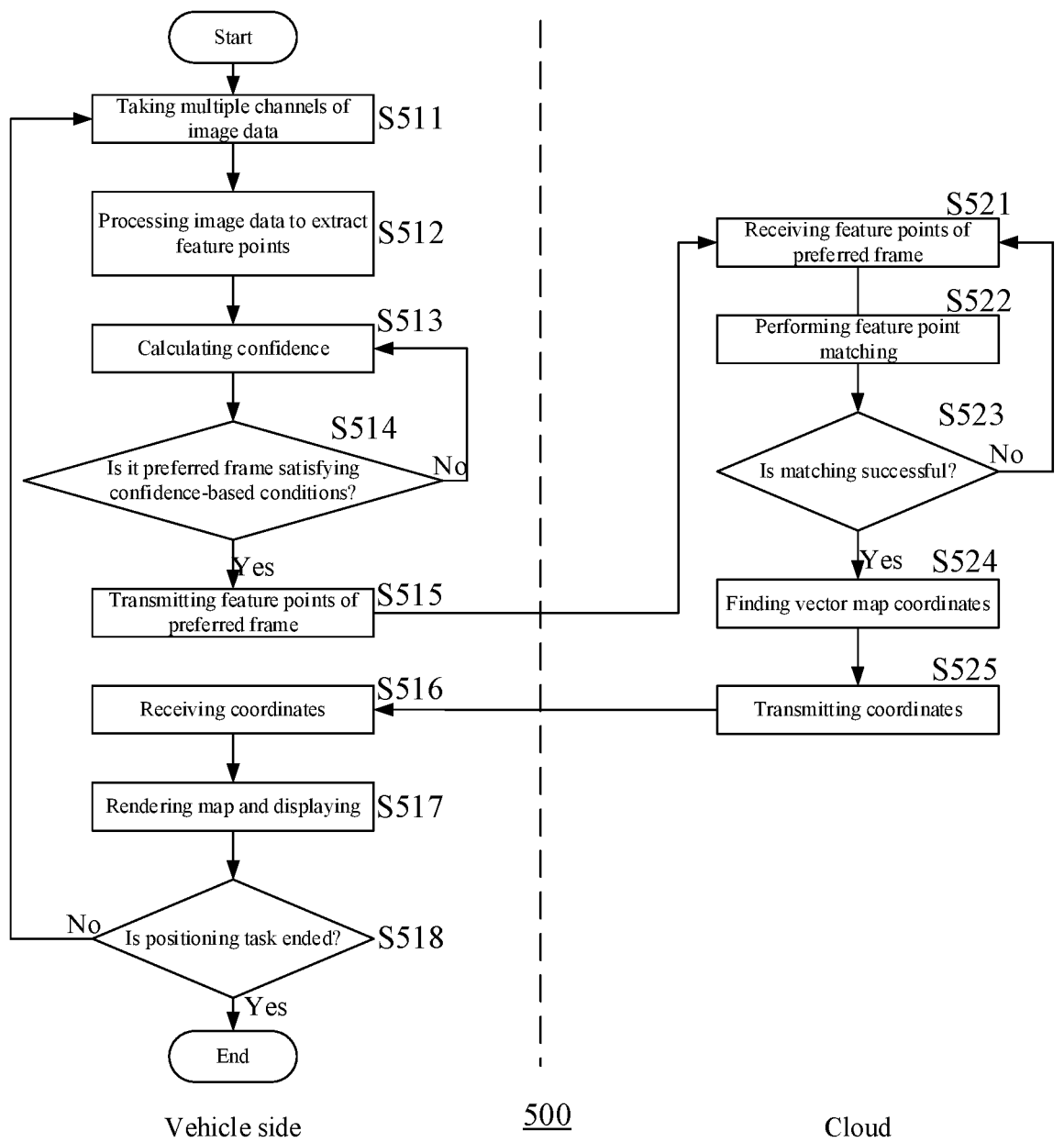
FIG. 5 illustrates a flowchart of a method for vehicle positioning cooperatively performed at the vehicle side and at the cloud according to embodiments of the present disclosure.

An exemplary process of interaction between the vehicle side and the cloud for vehicle positioning according to an optional embodiment of the present disclosure will be described below as a whole with reference to FIG. 5. FIG. 5 illustrates a flowchart of a method 500 for vehicle positioning cooperatively performed at the vehicle side and at the cloud according to embodiments of the present disclosure, where in method 500, steps S511 to S518 are performed at the vehicle side and steps S521 to S525 are performed at the cloud.

As shown in FIG. 5, the method 500 for vehicle positioning begins at S511, where the vehicle side may take multiple channels of image data with a camera; and at S512, the multiple channels of image data (e.g., N channels of image data, where N>2) may be processed (e.g., SLAM modeled) to extract feature points. Next, at S513, a confidence of current image frame (e.g., the image frame of the i-th channel of image data at the current moment, where i=1, 2, . . . , N) of one channel of image data in the multiple channels of image data may be calculated based on the extracted feature points; and then at S514, it is determined whether the current image frame of this channel of image data is a preferred frame that satisfies confidence-based conditions (e.g., the confidence of this frame is greater than the confidence threshold); if the current image frame is a preferred image frame, at S515, the feature points of the preferred frame are transmitted to the cloud; and if the current image frame is not the preferred frame, the method returns to S513, where the confidence of the next image frame (e.g., the image frame of the (i+1)-th image data at the current moment) is calculated, and at S514, it is determined whether the image frame is a preferred frame. The above operations would be cyclically performed, until a preferred frame is determined at S514. At S515, the feature points of the preferred frame may be transmitted to the cloud for feature point matching.

It should be understood that the embodiment illustrated in FIG. 5 (specifically, steps S513 to S515 in FIG. 5) may be embodiments in which the first frame with a confidence higher than the threshold in an order is selected as the preferred frame from the image frames of multiple channels of image data (sequentially in the order of the first channel, the second channel, the third channel, . . . , and the N-th channel). Although not shown in FIG. 5, in the embodiments according to the present disclosure, if the confidence-based conditions are not satisfied after the traverse of the image frames from the first channel to N-th channel at the current moment, the method may return to S511 to obtain the multiple channels of image data at the next moment, and then steps S512 to S515 would be performed for the multiple channels of image data at the next moment.

After determining the feature points of the preferred frame at the vehicle side, the method 500 is in turn performed at the cloud for feature point matching. At step S521, the cloud may receive the feature points of the preferred frame transmitted from the vehicle side; at S522, the feature points may be matched with a complete fused map pre-established at the cloud; next, at S523, it may be determined whether the matching is successful; if the matching is successful, a coordinate of the vehicle in a corresponding vector map may be found according to positioning information of the complete fused map at S524, and coordinates in the vector map may be transmitted to the vehicle at S525; and if the matching is unsuccessful, the method may return to S521 to receive feature points of a new preferred frame for a new round of feature point matching.

After feature point matching is completed at the cloud, the method 500 returns to be performed at the vehicle side to present the result of feature point matching at the vehicle side. Specifically, at S516, the vehicle side may receive its own coordinate in the vector map; at S517, a map may be rendered based on coordinates in the vector map, and the rendered map may be displayed on a display, for example, to present the result of positioning to the driver; and at S518, it may be determined whether the positioning task ends, for example, whether the driver requires to stop the positioning process and if it has not ended, the method returns to S511 to take multiple channels of image data to perform the vehicle positioning based on the multiple channels of image data at the subsequent moment.

FIG. 6 illustrates a schematic diagram of a system 600 for vehicle positioning according to embodiments of the present disclosure. As shown in FIG. 6, the system 600 may include a device 610 arranged at the vehicle side and a device 620 arranged at the cloud. The device 610 at the vehicle side may include cameras 611, a computing component 612, and a communication component 613. In the embodiment according to the present disclosure, the device 610 may further optionally include a display 614 for presenting a map to the driver. The device 620 at the cloud may include a computing component 621 and a communication component 622.

Specifically, at the vehicle side, the cameras 611 may be configured to obtain multiple channels of image data of surrounding environment of a vehicle, where the multiple channels of image data are taken by the cameras 611 on the vehicle at different angles. The computing component 612 may be configured to process the multiple channels of image data to extract feature points in image frames of each channel of image data, and specifically, may include a processing module (e.g., a SLAM modeling module) for extracting feature points and calculating confidence, a back-end visual fusion module for selecting a preferred frame, a vector map rendering module for rendering map to present current position and the like. The communication component 613 may be configured to transmit the feature points to the cloud and receive from the cloud a coordinate of the current position of the vehicle in a vector map obtained by feature point matching. The display 614 may be configured to display to the driver a map marking the current position of the vehicle.

At the cloud, the computing component 621 may be configured to match the feature points from the vehicle side with a complete fused map pre-established at the cloud; and in case of successful matching, the coordinate of the vehicle in the vector map is obtained according to positioning information of the complete fused map. Specifically, the computing component may include a feature point matching module configured to perform feature point matching, a coordinate calculation module configured to obtain coordinates in the vector map, and the like. The communication component 622 may be configured to receive the feature points of visual information from the vehicle and transmit coordinates in the vector map obtained by feature point matching to the vehicle.

Also, the communication component 613 at the vehicle side and the communication component 622 at the cloud are configured to be able to communicate with each other (e.g., by wired and/or wireless means) for cooperation between the cloud and the vehicle side, such as transmission of feature points from the vehicle side to the cloud, transmission of current coordinates in the vector map from the cloud to the vehicle side, and the like.

Figure 7:
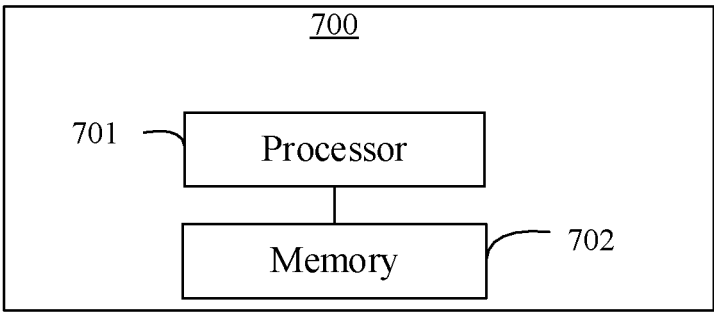
FIG. 7 illustrates a schematic diagram of an apparatus for vehicle positioning according to embodiments of the present disclosure.

FIG. 7 illustrates a schematic diagram of an apparatus 700 for vehicle positioning according to embodiments of the present disclosure. As shown in FIG. 7, the apparatus 700 may include a processor 701 and a memory 702.

The processor 701 may be any device with processing capability capable of implementing the functions of various embodiments of the present disclosure, for example, it may be a general-purpose processor, a digital signal processor (DSP), an ASIC, a field programmable gate array signal (FPGA) or other programmable logic device (PLD), discrete gate or transistor logic, discrete hardware components or any combination thereof designed for performing the functions described herein.

The memory 702 may include computer system readable media in the form of volatile memory, such as random access memory (RAM) and/or cache memory, and may also include other removable/non-removable, volatile/nonvolatile computer system memories, such as hard disk drive, floppy disk, CD-ROM, DVD-ROM or other optical storage media.

In this embodiment, the memory 702 has stored computer program instructions therein, and the processor 701 may execute the instructions stored in the memory 702. When the computer program instructions are executed by the processor, the processor is caused to perform the method for vehicle positioning of the embodiments of the present disclosure. The method for vehicle positioning is basically the same as that described above with reference to FIGS. 1 to 5, and therefore, in order to avoid repetition, it is omitted here.

The method/device for vehicle positioning according to the present disclosure can also be implemented by providing a computer program product containing program codes for implementing the said method or device, or by arbitrary storage medium storing such a computer program product. Thus, the method/device of the present disclosure may be implemented as a non-transitory computer-readable medium including instructions stored in a memory and executed by a processor.

In the present disclosure, with multiple channels of cameras, through local SLAM modeling and confidence filtering, the local modeling feature points are matched with the cloud fused map, which reduces the amount of data transmitted while increasing the range of the field of view, thus forming an efficient technical solution with high recognition rate and low amount of data.

The advantages of the method and apparatus for vehicle positioning according to the present disclosure include:

1. By utilizing multiple channels of image data from multiple cameras, a field of view with a larger angle (which may be up to a full perspective of 360 degrees of round view) is obtained, which maximizes the visual input information in a complex environment;

2. By cooperating with the vehicle side at the cloud, transmitting the data obtained at the vehicle side to the cloud, and performing positioning and matching at the cloud, the computing power consumption at the vehicle side is reduced;

3. By utilizing the confidence-based conditions to filter the obtained multiple channels of image frames, so as to make the amount of data of the preferred frames filtered and uploaded to the cloud to be consistent with the amount of data of the technical solution adopting a single camera, it is unnecessary to improve the requirements for computing power and communication while maximizing the field of view; and 4. By uploading the data of feature points of the image rather than the image itself to the cloud for matching, the amount of data for vehicle-cloud communication is reduced.

The basic principles of the present disclosure have been described above in combination with specific embodiments, but it should be pointed out that the advantages, benefits, effects, and the like mentioned in the embodiments of the present disclosure are only examples rather than limitations, and these advantages, benefits, effects and the like cannot be considered as necessary for various embodiments of the present disclosure. In addition, the specific details disclosed above are only for the purpose of illustration and easy understanding, but not for limitation, and the above details do not limit that the present disclosure must be implemented with the above specific details.

The block diagrams of devices, equipment, apparatuses, and systems involved in the embodiments of the present disclosure are only illustrative examples and are not intended to require or imply that they must be connected, arranged, and configured in the manner shown in the block diagram. As those skilled in the art will recognize, these devices, equipment, apparatuses, and systems can be connected, arranged, and configured arbitrarily. Words such as "including", "containing", "having" and so on are open words, which mean "including but not limited to" and can be used interchangeably therewith. Terms such as "or" and "and" as used herein refer to the phrase "and/or", and can be used interchangeably therewith, unless explicitly indicated otherwise in the context. The word "such as" as used herein refers to the phrase "such as but not limited to", and can be used interchangeably therewith.

In addition, as used herein, the "or" used in the enumeration of items starting with "at least one of" indicates a separate enumeration, so that, for example, the enumeration of "at least one of A, B or C" means A or B or C, or AB or AC or BC, or ABC (i.e. A and B and C). Furthermore, the wording "exemplary" does not mean that the described example is preferred or better than other examples.

It should also be pointed out that in the device and method of the present disclosure, various components or steps can be decomposed and/or recombined. These decomposition and/or recombination should be regarded as equivalent solutions of the present disclosure.

For ordinary skilled in the art, it can be understood that all or any part of the method and device disclosed in the present disclosure can be implemented in hardware, firmware, software, or combination thereof in any computing device (including processor, storage medium, etc.) or network of computing devices. The hardware may be a general-purpose processor, a digital signal processor (DSP), an ASIC, a field programmable gate array signal (FPGA) or other programmable logic device (PLD), discrete gate or transistor logic, discrete hardware components, or any combination thereof designed for performing the functions described herein. A general-purpose processor may be a microprocessor, but alternatively, the processor may be any commercially available processor, controller, microcontroller, or state machine. A processor may also be implemented as a combination of computing devices, such as a combination of a DSP and a microprocessor, a plurality of microprocessors, one or more microprocessors cooperating with a DSP core, or any other such configuration. The software may exist in any form of computer-readable tangible storage media. By way of example and not limitation, such computer-readable tangible storage media may include RAM, ROM, EEPROM, CD-ROM or other optical disk storage, magnetic disk storage or other magnetic storage devices, or any other tangible media that can be used to carry or store desired program codes in the form of instructions or data structures and that can be accessed by a computer. As used herein, a disc includes compact disc (CD), laser disc, optical disc, digital versatile disc (DVD), floppy disc, and Blu-ray disc.

Various changes, substitutions, and modifications may be made to the techniques described herein without departing from the taught techniques defined by the appended claims. In addition, the scope of the claims of the present disclosure is not limited to the specific aspects of the above-mentioned processes, machines, manufactures, composition of events, means, methods, and actions. Currently existing or later-to-be-developed processes, machines, manufactures, composition of events, means, methods, or actions that perform substantially the same functions or achieve substantially the same results as the corresponding aspects described herein may be utilized. Accordingly, the appended claims include, within their scope, such processes, machines, manufactures, composition of events, means, methods, or actions.

The above description of the disclosed aspects is provided to enable any skilled in the art to make or use the present disclosure. Various modifications to these aspects will be obvious to those skilled in the art, and the general principles defined herein can be applied to other aspects without departing from the scope of the present disclosure. Therefore, the present disclosure is not intended to be limited to the aspects shown herein, but is to be accorded the widest scope consistent with the principles and novel features disclosed herein.

The foregoing description has been presented for purposes of illustration and description. Furthermore, this description is not intended to limit the embodiments of the present disclosure to the forms disclosed herein. Although several example aspects and embodiments have been discussed above, those skilled in the art will recognize certain variations, modifications, changes, additions, and sub-combinations thereof.

What is claimed is:

1. A method for vehicle positioning, comprising:
obtaining multiple channels of image data of a surrounding environment of a vehicle, wherein the multiple channels of image data are taken by multiple cameras at different angles concurrently;
processing the multiple channels of image data to extract feature points in image frames of each channel of image data, determining confidences for the image frames of each channel of image data, and selecting a preferred frame from the image frames based on the confidences; and
transmitting the feature points to a cloud by transmitting the feature points in the preferred frame to the cloud, and receiving, from the cloud, a coordinate of current position of the vehicle in a vector map obtained by feature point matching.

2. The method according to claim 1, wherein processing the multiple channels of image data to extract feature points in an image frame of each channel of image data comprises:
performing simultaneous localization and mapping modeling on the multiple channels of image data to extract feature points of visual information from image frames of each channel of image data in the multiple channels of image data.

3. The method according to claim 1, wherein determining confidences and selecting a preferred frame based on the confidences comprises:
calculating respective confidences of individual image frames based on the feature points of visual information extracted from the image frames of each channel of image data in the multiple channels of image data; and
selecting, according to the confidences, the first frame with a confidence higher than a threshold in an order or a frame with the highest confidence, from the image frames as the preferred frame.

4. The method according to claim 1, further comprising rendering a map to be displayed on a display of the vehicle based on coordinates in the vector map.

5. The method according to claim 1, wherein the multiple channels of image data constitute a full field of view perspective.

6. An apparatus for vehicle positioning, comprising:
multiple cameras, configured to take multiple channels of image data of a surrounding environment of a vehicle at different angles concurrently;
a computing component, configured to process the multiple channels of image data to extract feature points in image frames of each channel of image data, determine confidences for the image frames of each channel of image data, and selecting a preferred frame from the image frames based on the confidences; and
a communication component, configured to transmit the feature points to a cloud by transmitting the feature points in the preferred frame to the cloud and receive from the cloud a coordinate of current position of the vehicle in a vector map obtained by feature point matching.

7. The apparatus according to claim 6, wherein the computing component is further configured to perform simultaneous localization and mapping modeling on the multiple channels of image data to extract feature points of visual information from image frames of each channel of image data in the multiple channels of image data.

8. The apparatus according to claim 6, wherein the computing component is further configured to:
calculate respective confidences of individual image frames based on the feature points of visual information extracted from the image frames of each channel of image data in the multiple channels of image data; and
select, according to the confidences, the first frame with a confidence higher than a threshold in an order or a frame with the highest confidence, from the image frames as the preferred frame.

9. The apparatus according to claim 8, wherein the communication component is further configured to transmit the feature points of the preferred frame to the cloud.

10. The apparatus according to claim 6, wherein the computing component is further configured to render a map to be displayed on a display of the vehicle based on coordinates in the vector map.

11. The apparatus according to claim 6, wherein the multiple channels of image data constitute a full field of view perspective.

12. A non-transitory computer-readable medium comprising instructions stored in a memory and executed by a processor to carry out steps of a method comprising:
obtaining multiple channels of image data of a surrounding environment of a vehicle, wherein the multiple channels of image data are taken by multiple cameras at different angles concurrently;
processing the multiple channels of image data to extract feature points in image frames of each channel of image data, determining confidences for the image frames of each channel of image data, and selecting a preferred frame from the image frames based on the confidences; and
transmitting the feature points to a cloud by transmitting the feature points in the preferred frame to the cloud, and receiving, from the cloud, a coordinate of current position of the vehicle in a vector map obtained by feature point matching.

13. The computer-readable medium according to claim 12, wherein processing the multiple channels of image data to extract feature points in an image frame of each channel of image data comprises:
performing simultaneous localization and mapping modeling on the multiple channels of image data to extract feature points of visual information from image frames of each channel of image data in the multiple channels of image data.

14. The computer-readable medium according to claim 12, wherein determining confidences and selecting a preferred frame based on the confidences comprises:

calculating respective confidences of individual image frames based on the feature points of visual information extracted from the image frames of each channel of image data in the multiple channels of image data; and selecting, according to the confidences, the first frame with a confidence higher than a threshold in an order or a frame with the highest confidence, from the image frames as the preferred frame.

15. The computer-readable medium according to claim 12, wherein the instructions are further executed by the processor to render a map to be displayed on a display of the vehicle based on coordinates in the vector map.

16. The computer-readable medium according to claim 12, wherein the multiple channels of image data constitute a full field of view perspective.

* * * * *